(No Model.)
E. H. DONAHOE.
GREASE TRAP.
No. 524,498. Patented Aug. 14, 1894.
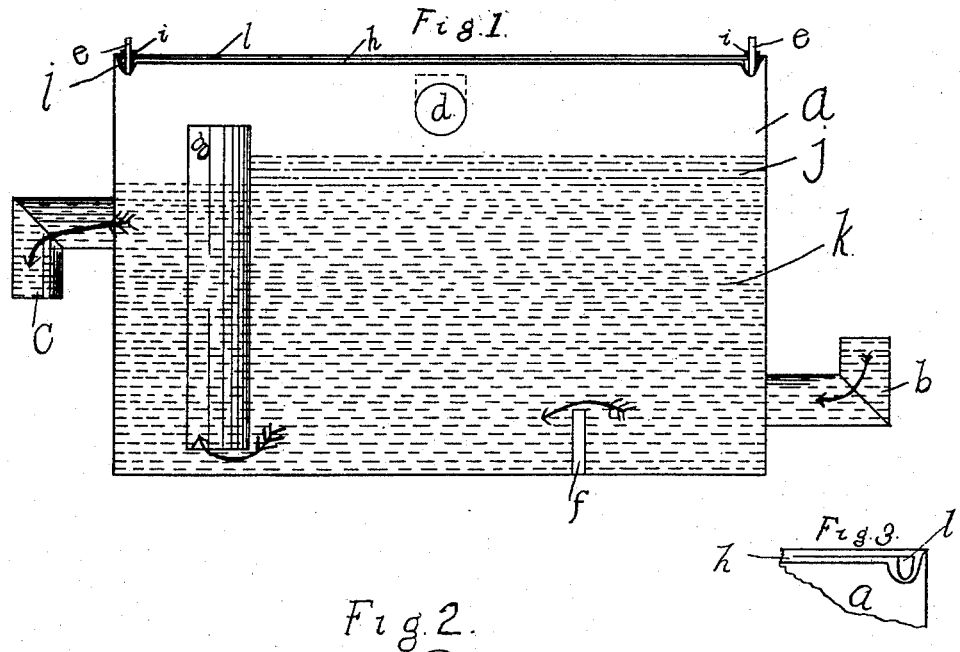
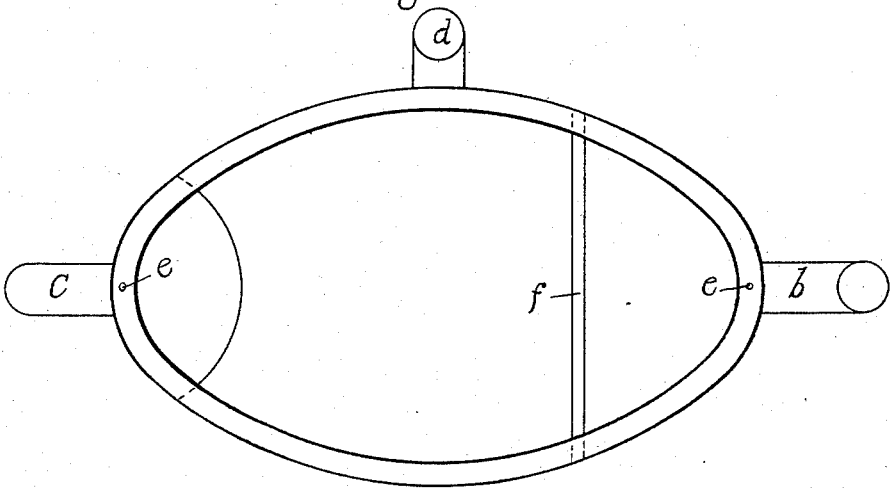
Witnesses.
H. D. Kramm
J. M. Harper.
Inventor
Edw. H. Donahoe
by W. V. Tefft
atty

United States Patent Office.

EDWARD H. DONAHOE, OF PEORIA, ILLINOIS.

GREASE-TRAP.

SPECIFICATION forming part of Letters Patent No. 524,498, dated August 14, 1894.

Application filed October 17, 1892. Serial No. 449,161. (No model.)

*To all whom it may concern:*

Be it known that I, EDWARD H. DONAHOE, a citizen of the United States, residing at Peoria, in the county of Peoria and State of Illinois, have invented certain new and useful Improvements in Grease-Traps; and I do hereby declare that the following is a full, clear, and exact description of the invention, which will enable others skilled in the art to which it appertains to make and use the same.

My invention relates to certain new and useful improvements in grease-traps by means of which a grease-trap is provided, being simple in construction, durable and cheap in first cost.

More particularly my invention relates to a trap or receptacle designed to be applied to the discharge-pipes of sinks, &c., and which is especially designed to separate grease and sediment from the water and collect it in a body so as to be otherwise disposed of, while allowing the water to escape without being impregnated with substances which would tend to choke or clog the pipes or sewers.

My invention consists essentially of a box or receptacle, having a partition extending across its interior and upwardly from the bottom a short distance, also another partition across its interior and extending from a point somewhat removed from the bottom to a point nearly to the top of the receptacle; the inlet pipe opening into the chamber at a point below the surface of the water and an outlet pipe opening out of the receptacle at a point near to the normal level of the water within the receptacle and connecting with a drain pipe or sewer, and the air-vent designed to be connected with the soil pipe to provide a ready circulation of cold air in connection with the outlet-pipe for the purpose of cooling the grease accumulated and harden the same. There is also provided a suitable lid separated from the body of the receptacle by a suitable gasket, and with suitable bolt and nut attachments for securing the lid firmly in position.

That my invention may be more fully understood reference is had to the accompanying drawings, in which—

Figure 1 is a sectional view cut vertically through the body of the receptacle. Fig. 2 is a plan view of the device, showing the relative adjustment of the outlet-pipes and partitions. Fig. 3 is a detailed view.

In the figures, *a* is a chamber or receptacle formed of any suitable material or desired size or shape with the top *h*, and provided with securing means consisting of the nuts *i*, *i* working in connection with threaded bolts *e*, attached to the main body, *i'* being a gasket intervening between the lid and the body of the receptacle; *b* is the inlet-pipe communicating with the chamber or receptacle *a*, from the sink or other place where the water and material to be separated may be discharged.

*c*, is the outlet-pipe which opens into the chamber at a point considerably above the mouth of the inlet pipe, and may be connected with the sewer pipe or drain; the mouth of the outlet pipe is situated at a point considerably above the level of the mouth of the inlet pipe *b*, so that at all times there will be a body of water standing between the level of the pipe *b*, and level with the lower edge of the mouth of the discharge pipe.

*f*, is a partition within the receptacle extending upwardly from its bottom portion for a short distance and is situated immediately in front of the inlet-opening, but being somewhat removed therefrom; *g*, is likewise a dividing partition located immediately in front of the outlet pipe or the mouth thereof, and is likewise somewhat removed therefrom, and extends from a point near to the bottom of the receptacle upwardly to a point near to the top part thereof, thus leaving space between lower edge and bottom and top portion of receptacle and upper edge of partition to provide communicating means between the partially separated portions of the receptacle, the lower communicating means being provided for the water within the receptacle and the top to accommodate the circulation of air.

*d* is a vent pipe opening into the receptacle at a point above the water and grease line to facilitate the circulation of air, through the receptacle.

In operation for the purpose designed, the water flowing into the compartment through the inlet-pipe striking the partition *f*, is checked and thrown upward as it enters into the chamber, the grease rising to the top and remaining there, while the water is allowed to flow freely over said partition, the heavy sediment being collected in the bottom of the receptacle. As the pipe $b$, enters below the surface of the water in the chamber, the water stands at a certain height within the receptacle, and any additional supply will raise the water therein so that it will flow out of the pipe $c$, the water so flowing out being obliged to pass under the lower edge of partition $g$ and rise above the lower edge of the outlet pipe, while the grease, which has been separated from the body of the water will have risen to the top of the water and is prevented from flowing out by the intervening partition $g$.

It will of course be understood that any grease or light substance of less specific gravity than the water that is mixed therewith, will readily rise to the surface where it will remain, usually hardening as the water becomes cool, but in this construction the vent pipe provides a special means for rapidly cooling, which is accompanied with a rapidly hardening of the grease and it can be removed by taking off the cover $h$, at any time.

The current of water entering from pipe $b$, strikes against the partition $f$, and will be checked so as to prevent any further agitation, while the grease will be deflected upward toward the surface.

It will be seen that a complete circulation of air and consequently a complete ventilation is established by the attachment of the vent pipe $d$, as it will readily be seen that at all times when the water within the receptacle is at its normal height, and when a new supply of water from a sink or other source is not flowing therein, that the pipe $c$, will be open, and if it be connected with a drain pipe or sewer, any impurities that may arise therefrom will readily escape through the vent pipe $d$, into the soil pipe and thence to a point without the building in which the device is contained and thus supplying through the vent-pipe a continuous supply of cold air that will facilitate greatly in hardening the grease to prevent its being diffused through the receptacle by any agitation occasioned by inflowing supply.

The form of the device, the material used and the arrangement of the elemental parts may be changed or substituted to suit the application in which it may be desired to be used.

I am aware that a grease trap has been made or proposed, having a shape somewhat elliptical in horizontal section, and having between the inlet and outlet pipes, two curved cross partitions, one at each end, arranged centrally between the top and bottom walls of the trap so as to allow a space above and below them, and a straight partition near the outlet pipe, and between the said two curved partitions, and I do not claim this as of my invention.

My grease trap differs from the earlier one in material ways, although the object of both inventions is the same, namely the collecting of the grease and lighter materials in the body of the trap. I have found that if the waste water is let into the trap at a point near the bottom thereof, more or less in a line with the straight partition, that the grease and particles of relatively less specific gravity will be deflected and rise to the surface of the water of the trap more quickly than if they are first directed downward after entering the trap at a point above the surface of the water. Therefore, I have arranged my inlet pipe in horizontal planes near that of the bottom of the trap, and leave the space between the straight partition and the said inlet pipe free from obstruction. Then in order that the greasy materials may have sufficient time to rise, I place the partition $f$ near the inlet pipe, so that it shall obstruct the flow of the water soon after it leaves the said pipe. The lowest part of the outlet pipe is placed much higher than the highest part of the inlet pipe so that the level of the water is kept above the highest part of the inlet pipe, thereby dispensing with the first partition in the said earlier waste trap referred to. Thus without enlarging the trap, greater space is gained for permitting the particles of grease and slime to rise before the water passes under the curved partition $g$, and out the outlet $c$.

Having thus fully described my invention, what I claim, and desire to secure by Letters Patent, is—

In a grease trap, a receptacle having an inlet opening at one end near the bottom thereof, a pipe leading thereto arranged outside the vertical vines of the receptacle, an outlet opening at the other end near the top thereof, a partition arranged across said receptacle and dividing it into two compartments, said partition extending from a horizontal plane above the surface of the water in said receptacle to a plane below the surface, there being free and unobstructed communication between said compartments above and below said partition for the circulation of air and the flow of the water, a deflecting plate in one of said compartments arranged between the inlet opening and the said partition, and extending up from the bottom of said compartment and ending at points in the horizontal planes of the inlet opening, and a vent pipe, substantially as set forth.

In testimony whereof I affix my signature in presence of two witnesses.

EDWARD H. DONAHOE.

Witnesses:
JOSIE TEFFT,
W. V. TEFFT.